M. KOIZUMI.
COMBINATION CULTIVATOR AND THINNER.
APPLICATION FILED FEB. 19, 1921.
1,433,209.
Patented Oct. 24, 1922.
2 SHEETS—SHEET 1.
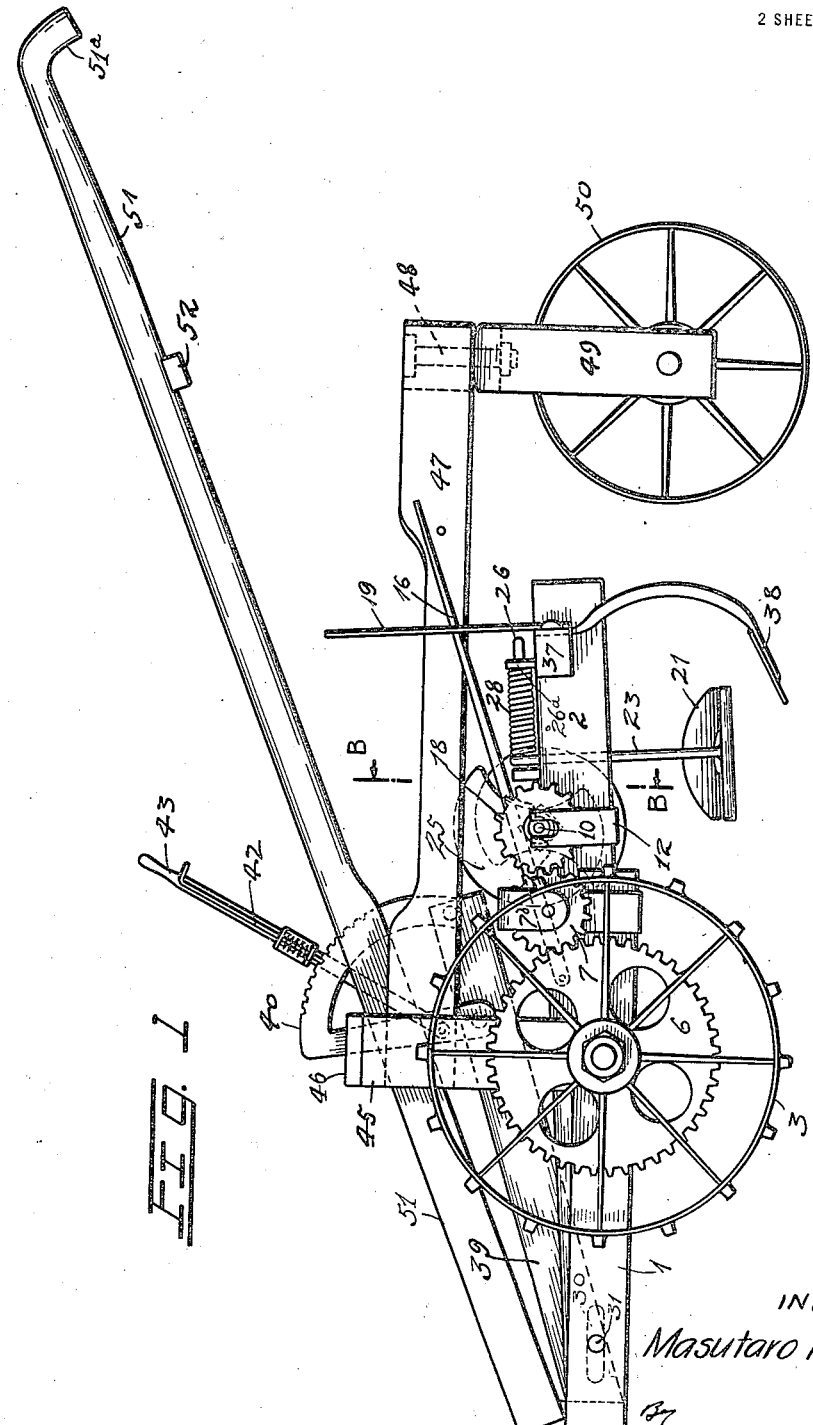
INVENTOR,
Masutaro Koizumi.
By Mason, Fenwick Lawrence,
ATTORNEYS

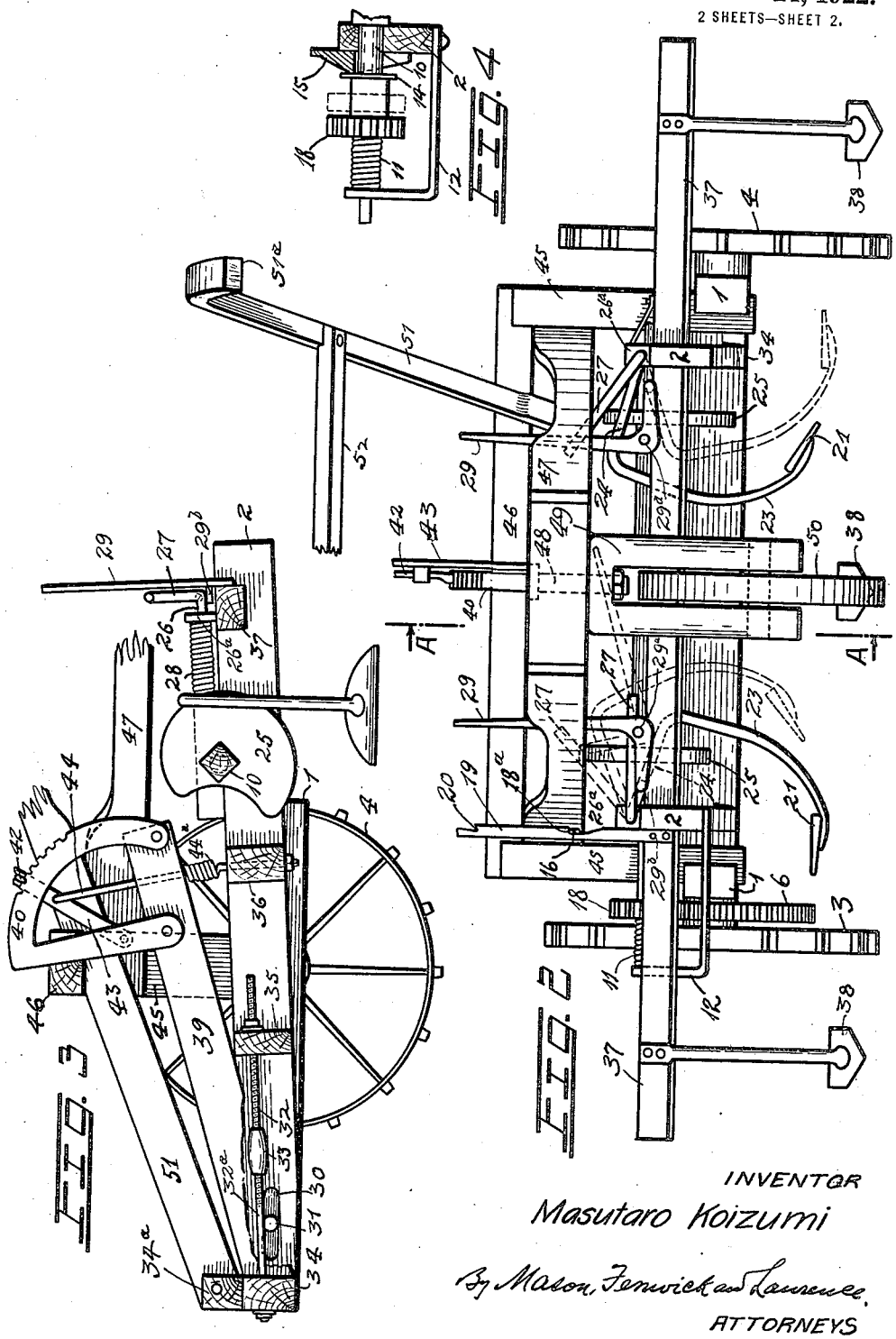

Patented Oct. 24, 1922.

1,433,209

UNITED STATES PATENT OFFICE.

MASUTARO KOIZUMI, OF BYRON, WASHINGTON.

COMBINATION CULTIVATOR AND THINNER.

Application filed February 19, 1921. Serial No. 446,211.

*To all whom it may concern:*

Be it known that I, MASUTARO KOIZUMI, a subject of the Emperor of Japan, residing at Byron, in the county of Yakima and State of Washington, have invented certain new and useful Improvements in Combination Cultivators and Thinners; and I do hereby declare the following to be a full, clear, and exact description of the invention, such as will enable others skilled in the art to which it appertains to make and use the same.

This invention relates to agricultural implements and more particularly to implements adapted to cultivate between rows of plants and simultaneously to thin out the plants in the rows.

It comprises a wheeled implement having earth working tools designed to plow and work the earth between two or more rows of plants, in combination with earth working tools operating laterally to thin out the plants in the rows. It also comprises adjustable means whereby to adjust the interval of operation of the side operating tools.

In the growing of food plants, such as carrots, beets and the like, the seed is first sowed or drilled in rows, and in practice much more seed is deposited than is necessary or desirable to produce the required number of plants. Therefore, when the plants have developed sufficient strength to assure a good stand, it is necessary to remove the surplus plants in order to enable the remainder to develop properly, and in so doing to establish the desired spacing between the plants. As different plants require different spacing in the rows, my improved implement provides for the proper adjustment to regulate the spacing between plants; at the same time it works the soil on one or both sides of each row.

In the accompanying drawings in which like reference characters designate like parts throughout the several views:

Figure 1 is a side elevation of my improved implement;

Figure 2 is a rear elevation thereof;

Figure 3 is a longitudinal section through the apparatus on line A—A of Figure 2, the caster wheel and frame and the guide handles being broken away;

Figure 4 is a detail sectional view on line B—B of Figure 1 showing a mechanism for throwing the side working tools out of operation.

In the accompanying drawings numeral 1 designates two side bars or beams of the main supporting frame, said side bars carrying stub axles upon which are journaled two ground or traction wheels 3 and 4. As shown in the drawings the side bars 1 are parallel with each other but they may converge toward their front ends if desired. Connecting the forward ends of the side bars 1 is a cross beam 34 to which is secured a beam 39 inclining upward and rearward; and from a member 34$^a$ secured on cross beam 34 diverging handle beams 51 incline upward and rearward connected near their rearward ends by a cross bar 52 rearward of which said beams 51 terminate in handles 51$^a$. Rising from the side beams 1 are uprights 45 connected by a cross beam 46, the said uprights 45 and cross beam 46 constituting an inverted U-shaped frame, the lower ends of which are rigidly connected to the side beams 1, while the handle beams 51 are firmly secured to said inverted U-shaped frame. A rack segment 40 is bolted to the upward inclined beam 39 and ties said beam rigidly to the cross beam 46. Extending rearward from the uprights 45 is a U-shaped frame 47 to the rear end of which is swiveled a forked wheel support 49 by means of a swivel bolt 48. Between the limbs of said forked support 49 is pivoted a caster wheel 50. Beams 1, 34, 45, 46, 47, 39 and 51 constitute a rigid frame supported on wheels 3, 4 and 50.

Pivoted on the segment 40 is a hand lever 43 having a hand latch 42, the end of which is adapted to engage the rack teeth on the segment 40. Pivoted on said lever 43 is a link 44 having its lower end coiled into a spring 44$^a$ which is connected to a cross bar 36 extending between side beams 2. The said beams 2 are also connected by cross bar 35 forward of the beam 36 and a cross beam 37 rearward thereof. Projecting inward from the forward end of each beam 1 of the main supporting frame is a pin 31 which engages in a slot 30 formed through each of said beams 2. Fixed in the cross beam 34 of the main frame is a bolt 32$^a$ having a threaded end while the bolt 32 is secured to the beam 35 and is threaded in the opposite direction to the thread of the bolt 32ª. The adjacent ends of the bolts 32 and 32ª are connected by right and left threaded nuts 33. By this construction it will be apparent that by rotating the nut or turnbuckle 33 the side beams 2 and all parts carried by them may be adjusted fore and aft of the machine to the extent permitted by the slot 30 and the pin 31. On the adjustable frame composed of said beams 2 and cross members 35, 36 and 37 are supported the earth working tools and operating mechanism.

Depending from the beam 37 which connects the rear ends of the side beams 2 of the adjustable frame are shovels or earth working implements 38 designed to turn or work the earth between the rows of plants, and these shovels may be elevated or depressed to a limited extent by lifting or lowering the adjustable frame by means of lever 43.

Pivoted in bearings 26ª on each beam 2 is a longitudinal shaft 26 which is connected to or formed with a bent shank 23 carrying a laterally movable earth working implement 21. The said shaft 26 is provided with an arm 27 extending from the shaft 26 toward the center of the machine from the rearward end of said shaft 26 the shank 23 extending from the forward end thereof. Shaft 26 is acted upon by a coil-spring 28 which has the effect by its tension of throwing the shank 23 and the earth working tool 21 outward away from the center line of the machine. The shank 23 of said earth working tool 21 extends inward at right angles from its connection with the shaft 26, as at 24, and then at approximately right angles downward, curving to the tool 21. A bell crank lever 29 pivoted to the beam 37 on the pivot 29ª has at its working end a pin 29ᵇ extending fore and aft and adapted to engage under the arm 27. By moving the handle of the bell crank lever 29 toward the center of the machine the arm 27 can be lifted and earth working tools 21 also lifted out of operative position.

A shaft 10, extending between the beams 2, carries a pair of cams 25 which are so placed as to operate upon the parts 24 of shanks 23 of the earth working tools 21 and lift them backward and upward, and then release said shanks so that springs 28 will act to throw said tools quickly laterally in order to strike at or beneath the roots of plants and thin out the plants of said rows wherever said tool engages.

On one end of shaft 10 is a pinion 18, said pinion being mounted so as to turn with the shaft but to be able to slide longitudinally thereof. The said pinion is pressed normally inward toward the frame bar 2 by means of a spring 11 which surrounds the shaft 10 between the pinion 18 and a bracket 12 which is secured to the beam 2. The pinion 18 is provided with a hub extending toward the beam 2 and a washer 14 is sleeved over the shaft 10 next to the end of the hub. A divided wedge 15 is adapted to be pushed downward astride the shaft 10 between the beam 2 and the washer 14 in order to displace the said pinion against the pressure of the spring 11, and when said wedge is raised the spring 11 will push the pinion 18 back into its normal operative position. A lever 16 is connected to said wedge 15 by means of which the wedge may be operated. In its normal operative position the pinion 18 is in mesh with an idler pinion 7 which is pivoted in a bracket 7ᵇ secured to a frame beam 1. The said idle pinion 7 meshes with a gear wheel 6 rigidly secured to the ground wheel 3. As a result of this construction when the implement is moving forward the pinion 6 rotates the pinion 18 through the idler 7 and the rotations of said pinion 18 operate the cams 25 which are so disposed with respect to each other as to lift and release the earth working implements 21 alternately, the implement on one side being lifted while the implement on the other is released and thrown by the spring 28 downward and outward.

In case it is desired to place the side operating tools 21 out of operation, the lever 16, which is pivoted to a frame bar 2 and connected to the wedge 15, may be depressed thus forcing the pinion 18 out of engagement with the idler. When the lever 16 is depressed it may be engaged in a notch 18ª carried on the locking member 19 extending upward from the beam 37; and the said lever 16 may be held upward in inoperative position by engaging with a notch 20 near the upper end of the said member 19.

When it is desired to vary the spacing between the plants the adjustable frame may be adjusted longitudinally by operating the turn buckle 33. A different sized pinion 18 may then be adjusted on the shaft 10. By this means the earth working tool 21 may be made to operate a greater or less number of times to a complete rotation of a traction wheel 3 or 4.

From the construction described it will be apparent that the machine is adapted to cut out the weeds between rows by the earth working tools or plows 38 and to loosen up the earth between the rows, and that simultaneously the side operating hoes will cut out the excessive plants at evenly spaced intervals of the rows.

Having described my invention in such manner as to enable those skilled in the art to make and use the same what I claim and desire to secure by Letters Patent is:

1. In an implement of the class described, a frame mounted on wheels, a side operating earth working tool pivoted on an axis extending longitudinally of the frame so as to oscillate about said axis, in a cylindrical arc whose center is said axis, a spring tending to force said tool outward, and a device adapted to retract said tool and overcome the action of said spring, and then to release said tool, and means operated by the ground wheels for operating said device.

2. In an implement of the class described, a frame mounted on wheels, a side operating tool pivoted on an axis extending longitudinally of the frame so as to oscillate about said axis, in a cylindrical arc whose center is said axis, a cam operated by the ground wheels for retracting said tool, a spring for giving a working stroke to said tool when released by the cam, and means adapted to retract and hold said tool out of the path of said cam to render the tool inoperative.

3. In an implement of the class described, a main frame, supporting wheels therefor, a second frame adjustable longitudinally of the main frame, side working tools supported by the adjustable frame and means connected to the ground wheels for operating said tools, said means including a pinion which is removable and adapted to be replaced by a pinion of a different size.

4. In an implement of the class described, a frame mounted on wheels, a frame slidable longitudinally of said main frame, right and left threaded screws connected respectively to said main and slidable frames, and a turnbuckle engaging said screws to adjust said adjustable frame, side earth-working tools mounted on said adjustable frame, and means for operating said tools from said ground wheels comprising a pinion removable from its shaft and replaceable by a pinion of a different size.

5. In an implement of the class described, a frame having cultivating tools secured thereto adapted to cultivate between rows, side operating tools pivoted thereto on axes extending longitudinally of the frame, means for actuating said side working tools from said ground wheels comprising a train of gears one of which is displaceable longitudinally of its axis, a spring tending to keep said displaceable gear in mesh, and a wedge adapted to force said gear out of mesh against the tension of said spring.

6. In an implement of the class described, a wheel supported frame, a side operating earth-working tool pivoted thereto so as to oscillate about an axis longitudinal of the frame, a revolving cam operated from a supporting wheel for moving said tool on its idle stroke, a spring for operating said tool on its working stroke, and a lever adapted to lift and hold said tool away from the arc of movement of the cam.

In testimony whereof I affix my signature.

MASUTARO KOIZUMI.